United States Patent
Li et al.

(10) Patent No.: US 11,546,839 B2
(45) Date of Patent: Jan. 3, 2023

(54) CHANNEL SCAN ASSISTED BY TWT

(71) Applicant: Hewlett Packard Enterprise Development LP, Houston, TX (US)

(72) Inventors: Jiaqi Li, Beijing (CN); Jianpo Han, Beijing (CN); Guangzhi Ran, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 47 days.

(21) Appl. No.: 17/145,689

(22) Filed: Jan. 11, 2021

(65) Prior Publication Data

US 2022/0225218 A1 Jul. 14, 2022

(51) Int. Cl.
*H04W 4/00* (2018.01)
*H04W 48/16* (2009.01)
*H04W 52/02* (2009.01)

(52) U.S. Cl.
CPC ....... *H04W 48/16* (2013.01); *H04W 52/0206* (2013.01)

(58) Field of Classification Search
CPC .......................... H04W 48/16; H04W 52/0206

USPC ....................................................... 455/434
See application file for complete search history.

(56) References Cited

U.S. PATENT DOCUMENTS

2019/0045438 A1* 2/2019 Cariou .............. H04W 52/0216

* cited by examiner

*Primary Examiner* — Tanmay K Shah
(74) *Attorney, Agent, or Firm* — Hewlett Packard Enterprise Patent Department (57) ABSTRACT

In embodiments of the present disclosure, there is provided an approach for performing channel scan by utilizing a target wake time (TWT) mechanism. According to embodiments of the present disclosure, a compound AP transmits, to an uplink AP, a request to negotiate a schedule for a TWT session. The compound AP receives a response to the request from the uplink AP. The response comprises timing information of the TWT session. Then, the compound AP performs channel scan during a sleep period determined from the timing information. Data transmission between the compound AP and the uplink AP is disabled during the sleep period. Embodiments of the present disclosure provide an effective way for performing the channel scan, thereby ensuring data delivery and enhancing connection robustness between the compound AP and the uplink AP.

20 Claims, 7 Drawing Sheets

CHANNEL SCAN ASSISTED BY TWT

BACKGROUND

An access point (AP) is a networking device that allows wireless devices such as Wireless Fidelity (Wi-Fi) devices to connect to a network such as Wide Area Network (WAN). Channel scan is a critical function widely used by core features of the AP, for example, Adaptive Radio Management (ARM), Wireless Intrusion Detection System (WIDS). A compound AP supporting both a station mode and an AP mode is faced with an issue that when the channel scan is performed, data frames from an uplink AP cannot be received by the compound AP. A client device (e.g., a cell phone, a computer) which also has the function of channel scan is faced with the same issue.

BRIEF DESCRIPTION OF THE DRAWINGS

Embodiments of the present disclosure may be understood from the following Detailed Description when read with the accompanying Figures. In accordance with the standard practice in the industry, various features are not drawn to scale. In fact, the dimensions of the various features may be arbitrarily increased or reduced for clarity of discussion. Some examples of the present disclosure are described with respect to the following figures.

DETAILED DESCRIPTION

As briefly mentioned above, the compound AP which supports both the station mode and the AP mode as well as the client device which has the function of channel scan are faced with an issue that when the channel scan is performed, data frames from the uplink AP are missed. This is because the uplink AP is unaware that the compound AP or the client device has switched to channel scan and thus still transmit data frames to the compound AP or the client device. This issue unfavorably degrades robustness of the connection between the uplink AP and the compound AP or the client device.

A mechanism called Target Wake Time (TWT) has been introduced in IEEE 802.11 ax standard, which enables devices to determine when and how frequently they will wake up to transmit and/or receive data. The TWT mechanism allows an AP and a device (also referred to as "TWT client" or "STA") to negotiate and define one or more TWT sessions to communication with each other. For example, the TWT client and the AP can negotiate parameters for a TWT session. After the TWT session is setup, the TWT client can enter a power-save mode and wake up to communicate with the AP according to the negotiated parameters.

The TWT session may comprise one or more sleep periods and one or more service periods. The term "sleep period" refers to a period of time during which data transmission between the AP and the TWT client is disabled. That is, during the sleep period, the TWT client enters the power save mode and data directed to the TWT client is buffered at the AP. The term "service period" refers to a period of time during which data transmission between the AP and the TWT client is enabled. That is, during the service period, the TWT client wakes up to transmit and/or receive data. Duration of the service period may be referred to as "TWT wake duration".

Embodiments of the present disclosure propose an efficient way of performing channel scan by utilizing the TWT mechanism. According to embodiments of the present disclosure, when there is a demand for channel scan at a device (for example, a compound AP or a client device), the device transmits, to an uplink AP serving the device, a request to negotiate a schedule for a TWT session. The uplink AP transmits a response to the request to the device. The response comprises timing information of the TWT session. Then, the device determines a sleep period from the timing information and performs the channel scan during the sleep period. During the sleep period, data transmission between the uplink AP and the device is disabled and any data may be buffered. When the device wakes up according to the timing information, the buffered data can be communicated between the uplink AP and the device.

In the embodiments of the present disclosure, the channel scan is assisted by the TWT mechanism. When the device (for example, the compound AP or the client device) intends to switch to channel scan, it may negotiate a TWT session with the uplink AP in advance. In other words, the device acts as a TWT requesting device and the uplink AP acts as a TWT responding device. Then, according to the negotiated TWT session, the device pretends to enter a power save mode when performing the channel scan. Accordingly, the uplink AP will treat the device as in the power save mode and will not blindly transmit data to the device, in this way, data occurring during the channel scan will not be missed by the compound AP or the client device. Therefore, data delivery between the device and the uplink AP can be ensured and robustness of connection between the device and the uplink AP can be enhanced by utilizing the TWT mechanism, even in the case of frequent channel scan.

Other advantages of embodiments of the present disclosure will be described with reference to the example implementation as described below. Reference is made below to FIG. 1 through FIG. 7 to illustrate basic principles and several example embodiments of the present disclosure herein.

Figure 1:
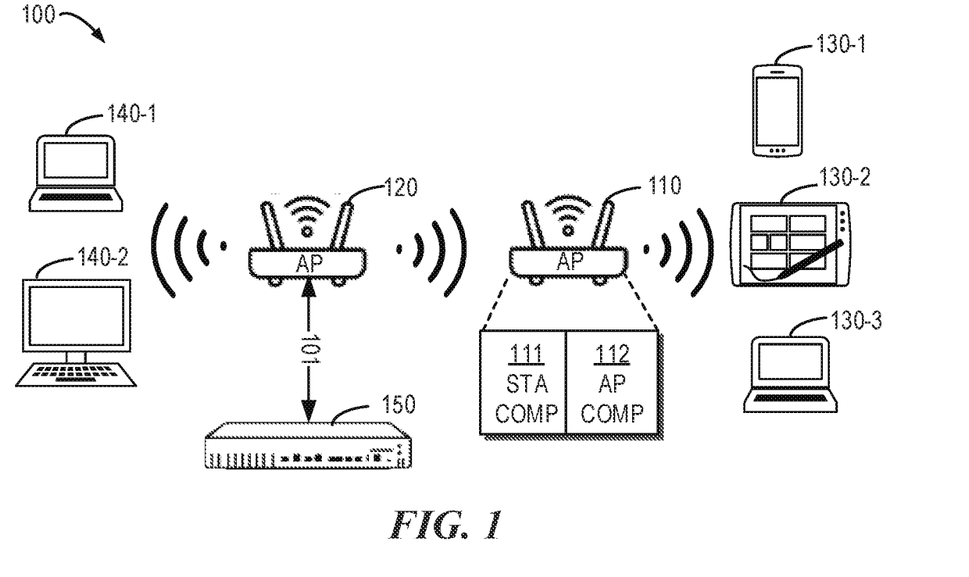
FIG. 1 illustrates an example environment in which embodiments of the present disclosure can be implemented.

FIG. 1 illustrates an example environment 100 in which embodiments of the present disclosure can be implemented. As shown in FIG. 1, the environment 100 comprises APs 110 and 120, a distribution device 150, client devices 130-1, 130-2 and 130-3 (collectively referred to as "client devices 130" or individually referred to as a "client device 130"), and client devices 140-1 and 140-2 (collectively referred to as "client devices 140" or individually referred to as a "client device 140").

The APs 110 and 120 are networking devices that allow wireless devices to connect to a network such as WAN. Usually, the AP 120 may connect to the distribution device 150 such a switch via a wired link 101, as shown in FIG. 1. In operation, the AP 120 provides wireless connections to the client devices 140 and the AP 120 using wireless Local Area. Network (WLAN) technology, for example.

The AP 110 supports both a station (abbreviated as "STA") mode and an AP mode and is also referred to as a "compound AP 110" in the following. In order to support these two modes, the compound AP 110 comprises a station component 111 and an AP component 112. In operation, the compound AP 110 acts as a station for the AP 120 by means of the station component 111 and acts as an AP for the client device 130 by means of the AP component 112. The station component 111 and the AP component 112 can be implemented by any suitable technology and the scope of the present disclosure is not limited in this regard.

The client device 130 and the client device 140 can be any terminal device that is capable of wireless communication. By way of example rather than limitation, the client device 130 and the client device 140 may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like.

In the environment 100, the AP 120 can communicate/transmit data to the client device 140 and the compound AP 110, and the client device 140 and the compound AP 110 can also communicate/transmit data to the AP 120. A link from the AP 120 to the compound. AP 110 or the client device 140 is referred to as a downlink (DL), while a link from the compound AP 110 or the client device 140 to the AP 120 is referred to as an uplink (UL). Accordingly, the AP 120 is an UL AP for the compound AP 110 and the client device 140.

Likewise, the compound AP 110 can communicate/transmit data to the client device 130, and the client device 130 can also communicate/transmit data to the compound AP 110. A link from the compound AP 110 to the client device 130 is referred to as a DI, while a link from the client device 130 to the compound AP 110 is referred to as an UL. Accordingly, the compound AP 110 is an UL AP for the client device 130.

In some embodiments, the compound AP 110 may have a demand for channel scan. When the compound AP 110 intends to perform the channel scan, it may negotiate a TWT session with the AP 120. Then, the compound AP 110 may perform the channel scan during a sleep period of the TWT session. Data may be communicated between the AP 120 and the compound AP 110 during a service period of the TWT session.

In some embodiments, a client device (for example, any of the client devices 130 and 140) may have a demand for channel scan. When the client device intends to perform the channel scan, it may negotiate a TWT session with its UL AP. Then, the client device may perform the channel scan during a sleep period of the TWT session. Data may be communicated between the UL AP and the client device during a service period of the TWT session. For example, the client device 130 may have the functionality of channel scan. When the client device 130 intends to perform the channel scan, it may negotiate a TWT session with the compound AP 110 and perform the channel scan during a sleep period of the TWT session.

Example processes are described below with reference to FIGS. 2-5. In the example processes, the compound AP 110 acts as a TWT requesting device to perform the channel scan. It is to be understood that the basic principles described with reference to FIGS. 2-5 can be applied in the case where a client device acts as a TWT requesting device to perform the channel scan.

Figure 2:
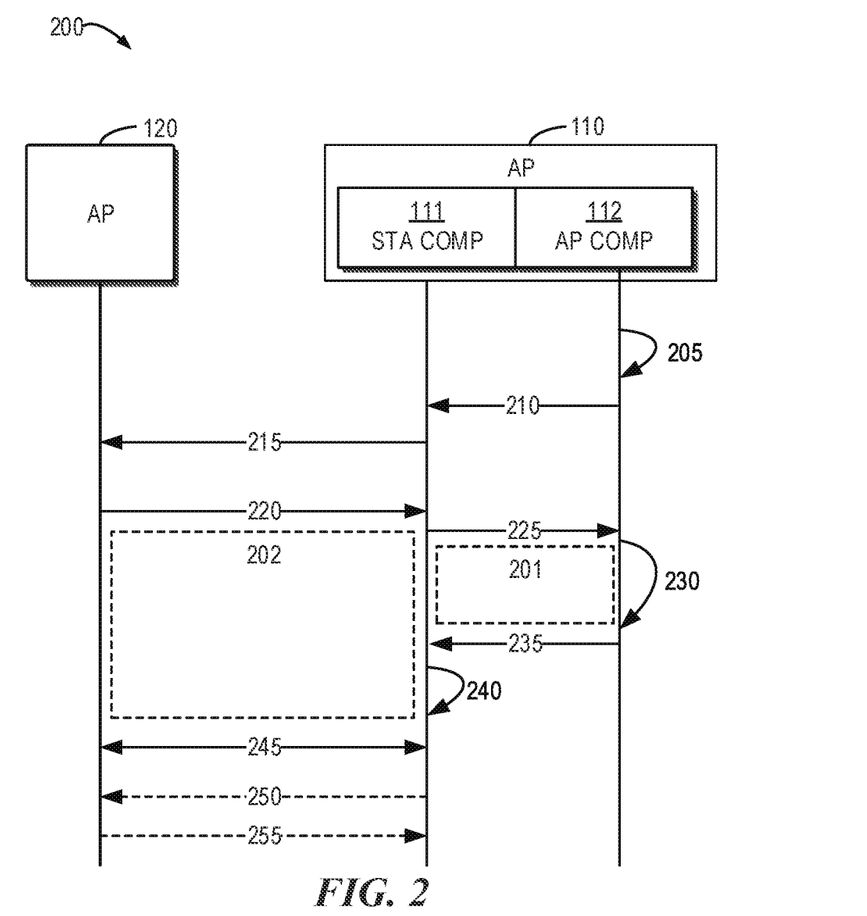
FIG. 2 illustrates a signaling chart of an example process fix performing aperiodic channel scan according to some embodiments of the present disclosure.

FIG. 2 illustrates a signaling chart of an example process 200 for performing aperiodic channel scan according to some embodiments of the present disclosure. In this process 200, the compound AP 110 and the AP 120 are involved. Although an act performed by the compound AP 110 is illustrated in FIG. 2 as being performed by a specific one of the station component 111 and the AP component 112, it is merely for purpose of illustration without any limitation to the scope of the present disclosure.

The compound AP 110 may intend to perform aperiodic channel scan. As show in FIG. 2, the AP component 112 may generate 205 a request for the channel scan, which is also referred to as a "scan request". In the example process 200, the scan request is an aperiodic scan request. The AP component 112 may indicate 210 the station component 111 to prepare for the channel scan.

Then, the AP station component 111 may transmit 215 a request to negotiate a schedule for a TWT session between the AP 120 and the compound AP 110. This request is also referred to as a "TWT request" and a frame carrying the TWT request may be referred to as a "TWT request frame". The TWT request may comprise a set of TWT parameters requested by the compound AP 110. For example, the TWT request may comprise a TWT wake time at which the compound AP will wake up to communicate with the AP 120. A difference between the TWT wake time and the current timestamp may be fake sleep duration. The fake sleep duration is long enough for duration of a scan dwell required by single channel scan such that the channel scan can be performed.

Different types of TWT operations can be implemented, including but not limited to, announced. TWT and unannounced TWT, implicit TWT and explicit TWT, non-triggered TWT and trigger-enabled TWT, and so on. The unannounced TWT means that an AP can transmit frames to a STA without any trigger from the STA as soon as a service period starts. The announced TWT means that an AP can transmit frames to a STA with a trigger from the STA as soon as a service period starts. The non-triggered TWT means that a STA does not need to wait for a trigger from an AP before it can transmit frames to the AP. The trigger-enabled TWT means that a STA needs to wait for a trigger from an AP before it can transmit frames to the AP.

In some embodiments, the TWT session may be a non-triggered and unannounced TWT session. In such embodiments, the TWT request may not include a trigger-enabled and announced parameter.

After receiving the TWT request from the compound AP 110, the AP 120 may transmit 220 a response to the TWT request. The response may be also referred to a "TWT accept" and a frame carrying the response may be referred to as a "TWT accept frame". The TWT accept may include timing information of the TWT session. The timing information may comprise a set of TWT parameters as negotiated by the AP 120 and the compound AP 110.

The timing information may include a start time of the TWT session, at which the compound AP will enter the power save mode. The timing information may further include a TWT wake time at which the compound AP 110 will wake up to communicate with the AP 120. It is to be understood that the TWT wake time in the TWT accept may be the same as or different from the TWT wake time in the TWT request. The start time of the TWT session and the TWT wake time may define a sleep period 202 as shown in FIG. 2. Data transmission between the AP 120 and the compound AP 110 is disabled during the sleep period 202. In other words, the AP 120 may treat the compound AP 110 as being in the power save mode during the sleep period 202. As a result, the AP 120 may buffer downlink data directed to the compound AP 110 during the sleep period 202.

Upon receiving the TWT accept from the AP 120, the compound AP 110 may determine the sleep period 202 from the timing information, for example based on the start time of the TWT session and the TWT wake time. The station component 111 may pretend to enter the power save mode during the sleep period 202. Accordingly, the compound AP 110 (for example, the station component 111) may buffer uplink data directed to the AP 120 during the sleep period 202.

As shown in FIG. 2, upon receiving the TWT accept from the AP 120, the station component 111 may indicate 225 the AP component 112 that the channel scan is approved. Then, the AP component 112 may perform 230 the channel scan within the sleep period 202. The channel scan may last for duration of the scan dwell 201 as shown in FIG. 2.

Upon completing the channel scan, the AP component 112 may indicate 235 the station component 111 that the channel scan is completed. The station component 111 may wait 240 for the TWT wake time, which may be a start time of a service period of the TWT session. Data transmission between the AP 120 and the compound AP 110 may be enabled during the service period. Then, the data buffered during the sleep period 202 may be communicated 245 between the AP 120 and the compound AP 110.

In the embodiments where the TWT session is the non-triggered and unannounced TWT session, the data transmission the AP 120 and the compound AP 110 can be resumed as soon as the service period starts. That is, the compound AP 110 may neither need to wait for a trigger from the AP 120 nor need to transmit a trigger to the AP 120 before it can transmit the buffered uplink data to the AP 120. In such embodiments, a signaling overhead for assisting the channel scan can be reduced.

In the example process 200, the scan request is an aperiodic scan request. In some embodiments, after waking up at the TWT wake time, the compound AP 110 may transmit 250 to the AP 120 a message to terminate the TWT session before an end of the service period. Alternatively, or in addition, in some embodiments, after the compound AP 110 wakes up at the TWT wake time, the AP 120 may transmit 255 to the compound AP 110 a message to terminate the TWT session before the end of the service period. For example, either of these messages may be carried by a TWT teardown frame.

In the example process 200, the aperiodic channel scan is performed with the assistance of the TWT mechanism. Data during the channel scan is being performed can be buffered and transmitted after the compound AP 110 wakes up. In this way, no uplink data is missed by the compound AP 110. Therefore, data delivery can be ensured and connection robustness can be enhanced.

Figure 3:
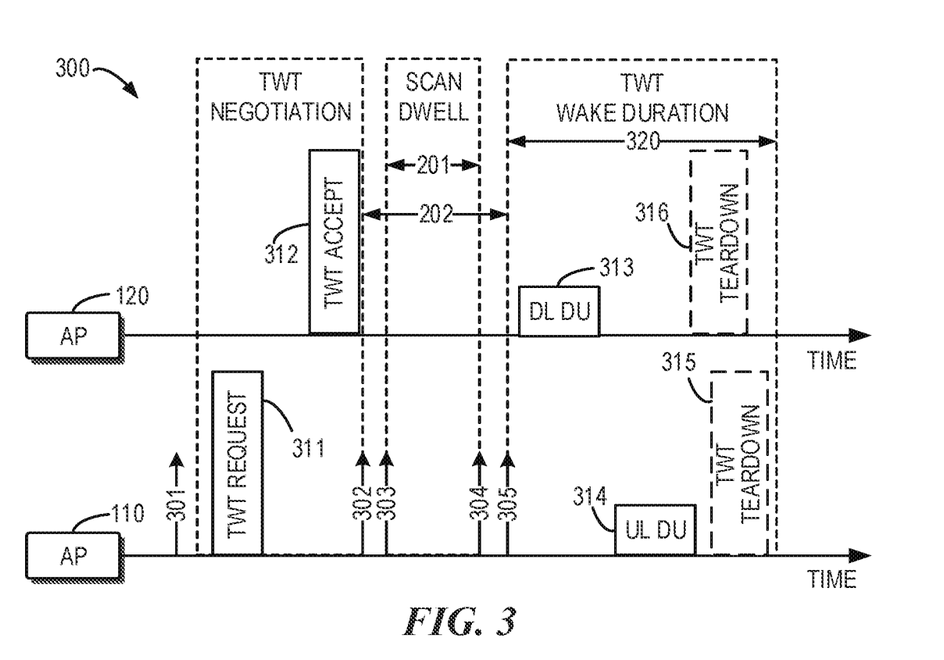
FIG. 3 illustrates a schematic timing diagram of aperiodic channel scan according to some embodiments of the present disclosure.

FIG. 3 illustrates a schematic timing diagram 300 of aperiodic channel scan according to some embodiments of the present disclosure. The timing diagram 300 may be considered as an example timing diagram for the process 200 as shown in FIG. 2.

As shown in FIG. 3, the scan request may be generated by the compound AP 110 at a time 301. For example, the AP component 112 may generate the scan request at the time 301. Then, TWT negotiation occurs between the compound AP 110 and the AP 120. During the TWT negotiation, the compound AP 110 may transmit the TWT request frame 311 to the AP 120 and the AP 120 may respond the compound AP 110 with the TWT accept frame 312.

According to the negotiated TWT session, the sleep period 202 may start at a time 302. During the sleep period 202, the AP 120 may treat the compound AP 110 as being in the power save mode. If there is downlink data directed to the compound AP 110, the AP 120 may buffer the downlink data.

The compound AP 110 may perform the channel scan during the sleep period 202. For example, the compound AP 110 may start the channel scan at a time 303 and complete the channel scan at a time 304. The time 303 and time 304 may define the duration of the scan dwell 201.

As shown in FIG. 3, the service period 320 of the TWT session may start at a time 305. In other words, the compound AP 110 may wake up at the time 305 to communicate with the AP 120.

During the service period 320, the AP 120 may transmit the buffered downlink data to the compound AP 110. For example, a DL data unit (DU) 313 may be transmitted to the compound AP 110 and the DL DU 313 may comprise the downlink data buffered during the sleep period 202. Likewise, the compound AP 110 may transmit the buffered uplink data to the AP 120. For example, a UL DU 314 may be transmitted to the AP 120 and the UL DU 314 may comprise the uplink data buffered during the sleep period 202. In addition to the data buffered during the sleep period 202, new data may be transmitted during the service period 320.

The compound AP 110 may transmit a TWT teardown frame 315 to the AP 120 during the service period 320 in order to terminate the TWT session before the end of the service period 320. The TWT session will be terminated when the compound AP 110 receives a TWT teardown acknowledge from the AP 120. Alternatively, or in addition, the AP 120 may transmit a TWT teardown frame 316 to the compound AP 110 during the service period 320 in order to terminate the TWT session before the end of the service period 320.

The TWT teardown frames 315 and 316 may be transmitted at any suitable time during the service period 320. In some embodiments, the TWT teardown frames 315 and 316 may be transmitted at a later stage of the service period 320, as shown in FIG. 3. In some embodiments, the TWT teardown frames 315 and 316 may be transmitted at an early stage of the service period 320. For example, the compound AP 110 may transmit the TWT teardown frame 315 or receive the TWT teardown frame 316 immediately after the start of the service period 320.

The example process and timing diagram for the aperiodic scan are described above. In the scenario of the aperiodic scan, the compound AP 110 may negotiate a new TWT session with new TWT parameters each time before the aperiodic scan. It is to be understood that the acts, frames and DUs as described with reference to FIGS. 2 and 3 are merely for purpose of illustration. Some of the acts, frames and DUs may be absent in some embodiments. For example, if there is neither data buffered during the sleep period nor new data during the service period, then no data may be communicated between the AP 120 and the compound AP 110 during the service period.

Figure 4:
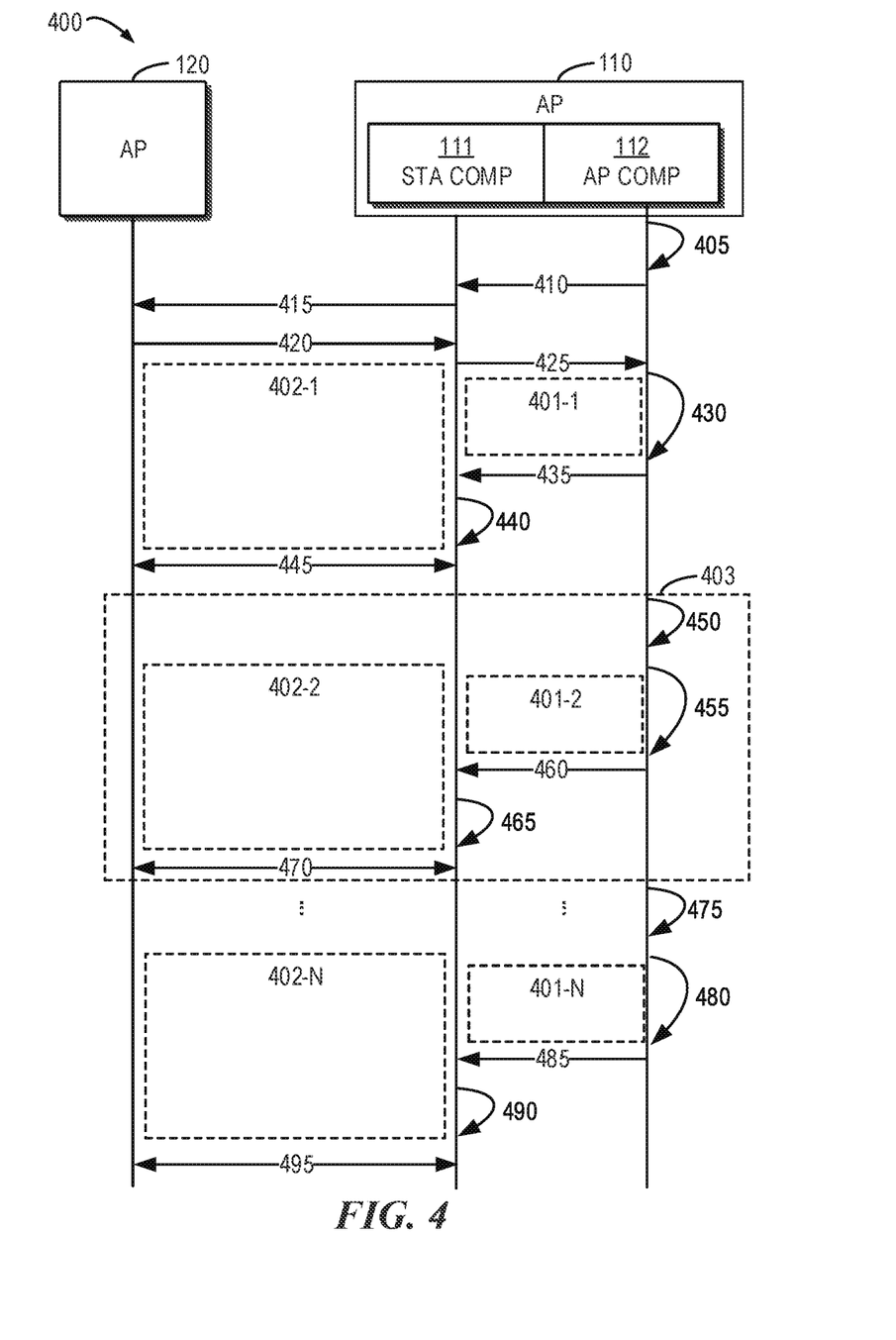
FIG. 4 illustrates a signaling chart of an example process for performing periodic channel scan according to some embodiments of the present disclosure.

FIG. 4 illustrates a signaling chart of an example process 400 for performing periodic channel scan according to some embodiments of the present disclosure, in this process 400, the compound AP 110 and the AP 120 are involved. Although an act performed by the compound AP 110 is illustrated in FIG. 4 as being performed by a specific one of the station component 111 and the AP component 112, it is merely for purpose of illustration without limitation to the scope of the present disclosure.

In the example process 400, the channel scan is performed periodically. For example, the AP component 112 may generate scan requests periodically. As a result, the example process 400 involves a plurality of sleep periods 402-1, 402-2, . . . , 402-N, where N is an integer. The plurality of sleep periods 402-1, 402-2, . . . , 402-N may be collectively referred to as "sleep periods 402" or individually referred to as a "sleep period 402". The example process 400 further involves a plurality of scan dwells 401-1, 401-2, . . . , 401-N. The plurality of scan dwells 401-1, 401-2, . . . , 401-N may be collectively referred to as "scan dwells 401" or individually referred to as a "scan dwell 401".

The compound AP 110 may intend to perform periodic channel scan. As show in FIG. 4, the AP component 112 may generate 405 the first scan request for the periodic channel scan. The AP component 112 may indicate 410 the station component 111 to prepare for the periodic channel scan.

Then, the AP station component 111 may transmit 415 a TWT request to negotiate a schedule for a TWT session between the AP 120 and the compound AP 110. The TWT request may comprise a set of TWT parameters requested by the compound AP 110. For example, the set of TWT parameters may comprise those described with reference to FIG. 2. Different types of TWT operations can be implemented, including but not limited to, announced TWT and unannounced TWT, implicit TWT, non-triggered TWT and trigger-enabled TWT, and so on.

In some embodiments, the TWT session may be a non-triggered and unannounced TWT session. In such embodiments, the TWT request may not include trigger-enabled and announced parameter.

After receiving the TWT request from the compound AP 110, the AP 120 may transmit 420 a response to the TWT request, which is also referred to as a "TWT accept". For example, a TWT accept frame may be transmitted to the compound AP 110. The TWT accept may comprise timing information of the TWT session. The timing information may comprise a set of TWT parameters as negotiated by the AP 120 and the compound AP 110. The set of TWT parameters as negotiated by the AP 120 and the compound AP 110 may be the same as or different from the set of TWT parameters requested by the compound AP 110.

In the scenario of periodic channel scan, the TWI session may comprise the plurality of sleep periods 402-1, 402-2, . . . , 402-N and a plurality of service periods. The implicit TWT may be implemented, and the set of TWT parameters in the TWT accept may comprise duration of each service period (that is, the maximum time for the compound AP 110 to wake up) and a time interval between two successive service periods. In the following, the duration of the service period is also referred to as "TWT wake duration". The interval between two successive service period s is also referred to as "TWT interval".

The plurality of sleep periods 402-1, 402-2, . . . , 402-N and the plurality of service periods of the TWT session can be determined by the set of TWT parameters, for example the TWT interval and the current TWT value. Data transmission between the AP 120 and the compound AP 110 is disabled during each sleep period 402. In other words, the AP 120 may treat the compound AP 110 as being in the power save mode during each sleep period 402. As a result, the AP 120 may buffer downlink data directed to the compound AP 110 during each sleep period 402.

Upon receiving the TWT accept from the AP 120, the compound AP 110 may determine the plurality of sleep periods 402 from the timing information, for example based on the set of TWT parameters. The station component 111 may pretend to enter the power save mode during each sleep period 402. Accordingly, the compound AP 110 (for example, the station component 111) may buffer uplink data directed to the AP 120 during each sleep period 402.

Specifically, as shown in FIG. 4, upon receiving the TWT accept from the AP 120, the station component 111 may indicate 425 the AP component 112 that the channel scan is approved. Then, the AP component 112 may perform 430 the channel scan within the first sleep period 402-1. The channel scan may last for the duration of the scan dwell 401-1 as shown in FIG. 4.

Upon completing the channel scan, the AP component 112 may indicate 435 the station component 111 that the channel scan is completed. The station component 111 may wait 440 for the TWT wake time, which is a start time of the first service period of the TWT session. Data transmission between the AP 120 and the compound AP 110 may be enabled during the first service period. Then, the data buffered during the first sleep period 402-1 may be communicated 445 between the AP 120 and the compound AP 110.

Then, the AP component 112 may generate 450 the second scan request for the periodic channel scan. The compound AP 110 may determine the second sleep period 402-2 from the timing information, for example based on the set of TWT parameters. The AP component 112 may perform 455 the channel scan within the second sleep period 402-2. The channel scan may last for the duration of the scan dwell 401-2 as shown in FIG. 4.

Upon completing the channel scan, the AP component 112 may indicate 460 the station component 111 that the channel scan is completed. The station component 111 may wait 465 for the TWT wake time, which is a start time of the second service period of the TWT session. Data transmission between the AP 120 and the compound AP 110 may be enabled during the second service period. Then, the data buffered during the second sleep period 402-2 may be communicated 470 between the AP 120 and the compound AP 110.

A procedure similar to the above-described procedure 403 is repeated for each scan request for the periodic channel scan. The AP component 112 may generate 475 the $N^{th}$ scan request for the periodic channel scan. The compound AP 110 may determine the $N^{th}$ sleep period 402-N from the timing information, for example based on the set of TWT parameters. The AP component 112 may perform 480 the channel scan within the $N^{th}$ sleep period 402-N. The channel scan may last for the duration of the scan dwell 401-N as shown in FIG. 4.

Upon completing the channel scan, the AP component 112 may indicate 485 the station component 111 that the channel scan is completed. The station component 111 may wait 490 for the TWT wake time, which is a start time of the $N^{th}$ service period of the TWT session. Data transmission between the AP 120 and the compound AP 110 may be enabled during the $N^{th}$ service period. Then, the data buffered during the $N^{th}$ sleep period 402-N may be communicated 495 between the AP 120 and the compound AP 110.

In the embodiments where the TWT session is the non-triggered and unannounced TWT session, the data transmission between the AP 120 and the compound AP 110 can be resumed as soon as each service period starts. That is, the compound AP 110 may neither need to wait for a trigger from the AP 120 nor need to transmit a trigger to the AP 120 before it can transmit the buffered uplink data to the AP 120. In such embodiments, a signaling overhead for assisting the channel scan can be reduced.

In the example process 400, the periodic channel scan is performed with the assistance of the TWT mechanism. Data during the channel scan is being performed can be buffered and transmitted after the compound AP 110 wakes up. In this way, no uplink data is missed by the compound AP 110. Therefore, data delivery can be ensured and connection robustness can be enhanced.

Figure 5:
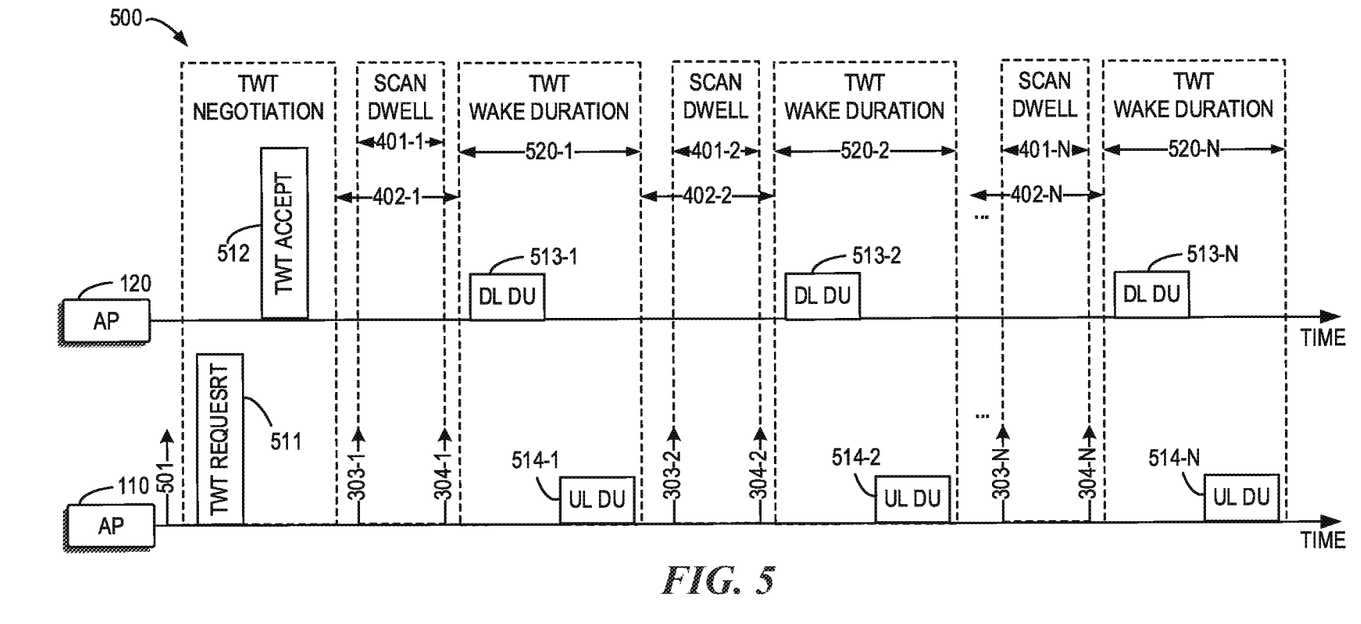
FIG. 5 illustrates a schematic timing diagram of periodic channel scan according to some embodiments of the present disclosure.

FIG. 5 illustrates a schematic timing diagram 500 of periodic channel scan according to some embodiments of the present disclosure. The timing diagram 500 may be considered as an example timing diagram for the process 400 as shown in FIG. 4.

As shown in FIG. 5, the first scan request may be generated by the compound AP 110 at a time 501. For example, the AP component 112 may generate the first scan request at the time 501. Then, TWT negotiation occurs between the compound AP 110 and the AP 120. During the TWT negotiation, the compound AP 110 may transmit the TWT request frame 511 to the AP 120 and the AP 120 may respond the compound AP 110 with the TWT accept frame 512.

The negotiated TWT session may comprise the plurality of sleep periods 402-1, 402-2, . . . 402-N and the plurality of service periods 520-1, 520-2, . . . , 520-N, which are collectively referred to as "service periods 520" or individually referred to as a "sleep period 520". During each sleep period 402, the AP 120 may treat the compound AP 110 as being in the power save mode. If there is downlink data directed to the compound AP 110, the AP 120 may buffer the downlink data.

The compound AP 110 may perform the channel scan during each sleep period 402. For example, the compound AP 110 may start the channel scan at a time 303-1 in response to the first scan request and complete the channel scan at a time 304-1. The time 303-1 and time 304-1 may define the duration of the scan dwell 401-1. Then, the compound AP 110 may start the channel scan again at a time 303-2 in response to the second scan request and complete the channel scan at a time 304-2. The time 303-2 and time 304-2 may define the duration of the scan dwell 401-2. Similar acts are repeated for each scan request for the periodic channel scan. The compound AP 110 may start again the channel scan at a time 303-N in response to the $N^{th}$ scan request and complete the channel scan at a time 304-N. The time 303-N and time 304-N may define the duration of the scan dwell 401-N.

As shown in FIG. 5, the compound AP 110 may wake up at the start time of each service period 520 to communicate with the AP 120.

During at least some of the service periods 520, the AP 120 may transmit the buffered downlink data to the compound AP 110. For example, DL DUs 513-1, 513-2, . . . , 513-N may be transmitted to the compound AP 110 during a respective service period 520. Each of the DL DUs 513-1, 513-2, . . . , 513-N may comprise downlink data buffered during a respective sleep period 402. Likewise, the compound AP 110 may transmit the buffered uplink data to the AP 120. For example, UL DUs 514-1, 514-2, . . . , 514-N may be transmitted to the AP 120 during a respective service period 520. Each of the UL DUs 514-1, 514-2, . . . , 514-N may comprise uplink data buffered during a respective sleep period 402. In addition to the data buffered during the sleep period 402, new data may be transmitted during the service period 520.

Although both downlink data and uplink data are communicated between the AP 120 and the compound AP 110 as shown in FIG. 5, it is merely for purpose of illustration. If there is neither data buffered during the sleep period nor new data during the service period, then no data may be communicated between the AP 120 and the compound AP 110 during the service period 520.

In the scenario of periodic channel scan, the compound AP 110 may not transmit a TWT teardown frame to the AP 120 during the service period 520. Although not shown, if the compound AP 110 determines to terminate the periodic channel scan, it may transmit the TWT teardown frame to the AP 110 during a specific service period to terminate the TWT session before the end of the specific service period. Alternatively, or addition, the compound AP 110 may receive the TWT teardown frame from the AP 120 during a specific service period to terminate the TWT session before the end of the specific service period.

The example process and timing diagram for the periodic scan are described above. In the scenario of the periodic scan, the compound AP 110 may only negotiate an implicit TWT session before the first scan request for the periodic channel scan. During the TWT session, the compound AP 110 may determine a start time of a next service period by adding a fixed value (that is, the TWT interval) to the start time of the current service period. Then, the compound AP 110 may perform the periodic channel scan during each sleep period and wake up to communicate with the AP 110 at the start time of each service period. It is to be understood that the acts, frames and DUs as described with reference to FIGS. 4 and 5 are merely for purpose of illustration. Some of the acts, frames and DUs may be absent in some embodiments.

Example processes for performing channel scan by utilizing the TWT mechanism are described with reference to FIGS. 2-5. In the example processes, the compound AP 110 acts as the TWT requesting device to perform the channel scan. It is to be understood that the basic principles described with reference to FIGS. 2-5 can be applied in the case where a client device (for example, the client device 130 or 140) acts as the TWT requesting device to perform the channel scan. For example, the acts described with respect to the compound AP 110 may be performed by the client device.

Figure 6:
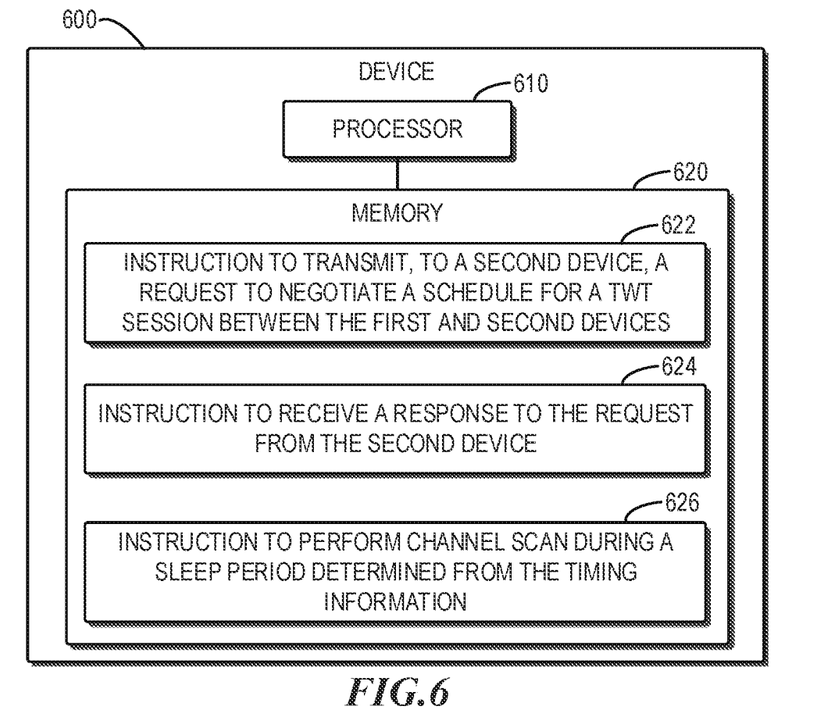
FIG. 6 illustrates an example device according to embodiments of the present disclosure.

FIG. 6 illustrates an example first device 600 according to embodiments of the present disclosure. The first device 600 comprises a processor 610 and a memory 620 coupled to the processor 610. The memory 620 stores instructions 622, 624 and 626 to cause the processor 610 to perform some acts. In some embodiments, the first device 600 may be implemented as the compound AP 110 as shown in FIG. 1. In some embodiments, the first device 600 may be implemented as a client device, for example, the client device 130 or 140 as shown in FIG. 1.

As shown in FIG. 6, the memory 620 stores instruction 622 to transmit to a second device, a request to negotiate a schedule for a TWT session between the first device 600 and second device. For example, the first device 600 may transmit a TWT request frame to the second device. In the embodiment where the first device 600 is implemented as the compound AP 110, the second device may be implemented as the AP 120 as shown in FIG. 1. In the embodiment where the first device 600 is implemented as the client device, the second device may be implemented as an AP serving the client device. As an example, if the first device 600 is implemented as the client device 130, the second device may be implemented as the compound AP 110. As another example, if the first device 600 is implemented as the client device 140, the second device may be implemented as the AP 120.

As shown in FIG. 6, the memory 620 stores instruction 624 to receive a response to the request from the second device. The response comprises timing information of the TWT session. For example, the first device 600 may receive a TWT accept frame from the second device. The TWT accept frame may comprise a set of TWT parameters, such as a start time of a sleep period, a start time of an initial service period, TWT wake duration, a TWT interval and so on.

As shown in FIG. 6, the memory 620 stores instruction 626 to perform channel scan during a sleep period determined from the timing information. Data transmission between the first device 600 and the second device is disabled during the sleep period. As an example, the first device 600 may determine the sleep period 202 based on the TWT parameters and perform the aperiodic channel scan during the sleep period 202. As another example, the first device 600 may determine each sleep period 402 and perform the periodic channel scan during each sleep period 402.

In some embodiments, the first device 600 tray buffer first data directed to the second device during the sleep period and determine, from the timing information, a target service period during which the data transmission between the first device 600 and the second device is enabled. The first device 600 may transmit the first data to the second device during the target service period. For example, the first device 600 may receive the DL DU 313 from the second device during the service period 320. The DL DU 313 may comprise downlink data buffered by the second device during the sleep period 202. Additionally, in some embodiments, the first device 600 may receive second data from the second device during the target service period. The second data may be buffered by the second device during the sleep period. For example, the first device 600 may transmit the UL, DU 314 to the second device during the service period 320. The UL DU 314 may comprise uplink data buffered by the first device 600 during the sleep period 202. As such, any data directed to the first and second devices during the channel scan can be delivered after the first device wakes up. In this way, no data is missed due to channel scan.

In some embodiments, the channel scan is performed periodically. The first device 600 may determine, from the timing information, a plurality of service periods of the TWT session and determine the target service period from the plurality of service periods. For example, the timing information may comprise a start time of the initial service period, the TWT wake duration and the TWT interval. The first device 600 may determine the plurality of service periods 520 based on the start time of the initial service period, the TWT wake duration and the TWT interval. The target service period may be a service period of the plurality of service periods 520 during which there is buffered data to be communicated. In this way, periodic channel scan can be performed with negotiating the TWT session only once.

In some embodiments, the channel scan is performed non-periodically. The first device 600 may determine, from the timing information, a target service period during which the data transmission is enabled. The first device 600 may transmit, to the second device during the target service period, a first message to terminate the TWT session before an end of the target service period. For example, the first device 600 may determine the service period 320 based on the TWT parameters. The first device 600 may transmit the TWT teardown frame 315 to the second device during the service period 320. Alternatively, or in addition, the first device 600 may receive from the second device during the target service period, a second message to terminate the TWT session before the end of the target service period. For example, the first device 600 may receive the TWT teardown frame 316 from the second device during the service period 320. As such, when there is no need for the channel scan, the TWT session can be terminated timely.

In some embodiments, the TWT session is a non-triggered and unannounced TWT session. In these embodiments, the TWT request and accept frames may not include trigger-enabled and announced parameter. The data transmission between the first device 600 and the second device can be resumed as soon as a service period starts. The first device 600 may neither need to wait for a trigger from the second device nor need to transmit a trigger to the second device before it can transmit the buffered data to the second device. In this way, a signaling overhead for assisting the channel scan can be reduced.

Embodiments of the present disclosure propose a way of performing channel scan by utilizing the TWT mechanism. In the embodiments of the present disclosure, data occurring during the channel scan will not be missed by the compound AP or the client device. Therefore, data delivery can be ensured and connection robustness can be enhanced by utilizing the TWT mechanism, even in the case of frequent channel scan.

Figure 7:
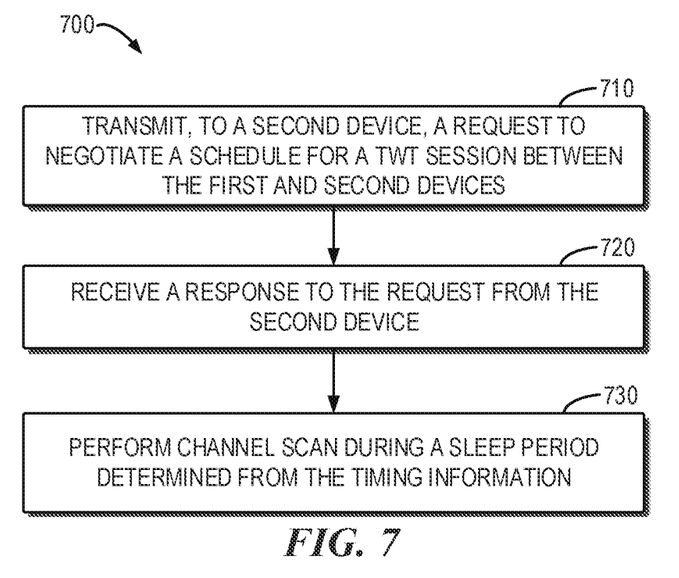
FIG. 7 illustrates a flow chart of an example method for performing channel scan according to embodiments of the present disclosure.

FIG. 7 illustrates a flow chart of an example method 700 for performing channel scan according to embodiments of the present disclosure. It is to be understood that the method 700 may be executed by a first device. In some embodiments, the first device may be implemented as the compound AP 110 and a second device may be implemented as the AP 120. Alternatively, in some embodiments, the first device may be implemented as a client device and the second device may be implemented as an AP serving the client device.

At block 710, a first device transmits, to a second device, a request to negotiate a schedule for a TWT session between the first and second devices. At block 720, the first device receives a response to the request from the second device. The response comprises timing information of the TWT session. At block 730, the first device performs channel scan during a sleep period determined from the timing information. Data transmission between the first and second devices is disabled during the sleep period. In this way, the channel scan is assisted by the TWT mechanism. Data delivery can be ensured and connection robustness can be enhanced by utilizing the TWT mechanism, even in the case of frequent channel scan.

Program codes or instructions for carrying out methods of the present disclosure may be written in any combination of one or more programming languages. These program codes or instructions may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine or entirely on the remote machine or server.

In the context of this disclosure, a machine-readable medium may be any tangible medium that may contain, or store a program for use by or in connection with an instruction execution system, apparatus, or device. The machine-readable medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Certain features that are described in the context of separate embodiments may also be implemented in combination in a single implementation. Conversely, various features that are described in the context of a single implementation may also be implemented in multiple embodiments separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed:

1. An access point comprising:
   a processor; and
   a memory coupled to the processor, the memory storing instructions to cause the processor to perform acts comprising:
      transmitting, to a further access point, a request to negotiate a schedule for a target wake time (TWT) session between the access point and the further access point;
      receiving a response to the request from the further access point, the response comprising timing information of the TWT session; and
      performing channel scan during a sleep period determined from the timing information, data transmission between the access point and the further access point disabled during the sleep period.

2. The access point according to claim 1, wherein the acts further comprises:
   buffering first data directed to the further access point during the sleep period;
   determining, from the timing information, a target service period during which the data transmission is enabled; and
   transmitting the first data to the further access point during the target service period.

3. The access point according to claim 2, wherein the acts further comprises:
   receiving second data from the further access point during the target service period, the second data buffered by the further access point during the sleep period.

4. The access point according to claim 2, wherein the channel scan is performed periodically and determining the target service period comprises:
   determining, from the timing information, a plurality of service periods of the TWT session; and
   determining the target service period from the plurality of service periods.

5. The access point according to claim 1, wherein the TWT session is a non-triggered and unannounced TWT session.

6. The access point according to claim 1, wherein the channel scan is performed non-periodically and the acts further comprises at least one of:
   transmitting, to the further access point during a target service period, a first message to terminate the TWT session before an end of the target service period, the data transmission is enabled during the target service period, or
   receiving, from the further access point during the target service period, a second message to terminate the TWT session before the end of the target service period.

7. The access point according to claim 1, wherein the access point acts as a station for the further access point.

8. A client device comprising:
   a processor; and
   a memory coupled to the processor, the memory storing instructions to cause the processor to perform acts comprising:
      transmitting, to an access point, a request to negotiate a schedule for a target wake time (TWT) session between the access point and the client device;
      receiving a response to the request from the access point, the response comprising timing information of the TWT session;
      determining a sleep period from the timing information, data transmission between the access point and the client device disabled during the sleep period; and
      performing channel scan during the sleep period.

9. The client device according to claim 8, wherein the acts further comprises:
   buffering first data directed to the access point during the sleep period;
   determining, from the timing information, a target service period during which the data transmission is enabled; and
   transmitting the first data to the access point during the target service period.

10. The client device according to claim 9, wherein the acts further comprises:
receiving second data from the access point during the target service period, the second data buffered by the access point during the sleep period.

11. The client device according to claim 9, wherein the channel scan is performed periodically and determining the target service period comprises:
determining, from the timing information, a plurality of service periods of the TWT session; and
determining the target service period from the plurality of service periods.

12. The client device according to claim 8, wherein the TWT session is a non-triggered and unannounced TWT session.

13. The client device according to claim 8, wherein the channel scan is performed non-periodically and the acts further comprises at least one of:
transmitting, to the access point during a target service period, a first message to terminate the TWT session before an end of the target service period, the data transmission is enabled during the target service period, or
receiving, from the access point during the target service period, a second message to terminate the TWT session before the end of the target service period.

14. A method comprising:
transmitting, from a first device to a second device, a request to negotiate a schedule for a target wake time (TWT) session between the first and second devices;
receiving a response to the request from the second device, the response comprising timing information of the TWT session; and
performing channel scan during a sleep period determined from the timing information, data transmission between the first and second devices disabled during the sleep period.

15. The method according to claim 14, wherein the acts further comprises:
buffering first data directed to the second device during the sleep period;
determining, from the timing information, a target service period during which the data transmission is enabled; and
transmitting the first data to the second device during the target service period.

16. The method according to claim 15, wherein the acts further comprises:
receiving second data from the second device during the target service period, the second data buffered by the second device during the sleep period.

17. The method according to claim 15, wherein the channel scan is performed periodically and determining the target service period comprises:
determining, from the timing information, a plurality of service periods of the TWT session; and
determining the target service period from the plurality of service periods.

18. The method according to claim 14, wherein the TWT session is a non-triggered and unannounced TWT session.

19. The method according to claim 14, wherein the channel scan is performed non-periodically and the acts further comprises at least one of:
transmitting, to the second device during a target service period, a first message to terminate the TWT session before an end of the target service period, the data transmission is enabled during the target service period, or
receiving, from the second device during the target service period, a second message to terminate the TWT session before the end of the target service period.

20. The access point according to claim 1, wherein the acts further comprises
receiving a request for the channel scan,
wherein the transmitting, to the further access point, the request to negotiate the schedule for TWT session between the access point and the further access point is in response to receiving the request for the channel scan.

* * * * *